United States Patent

Henriksson

[11] Patent Number: 5,828,701
[45] Date of Patent: Oct. 27, 1998

[54] METHOD AND CIRCUIT ARRANGEMENT FOR COMPENSATING FOR DELAYED COMPONENTS IN TRANSMISSION SIGNAL

[75] Inventor: Jukka Henriksson, Espoo, Finland

[73] Assignee: Nokia Technology GmbH, Pforzheim, Germany

[21] Appl. No.: 636,056

[22] Filed: Apr. 22, 1996

[30] Foreign Application Priority Data

Apr. 24, 1995 [FI] Finland .................................. 951936

[51] Int. Cl.$^6$ .............................. H03H 7/30; H03H 7/40
[52] U.S. Cl. .......................... 375/233; 375/232; 375/231
[58] Field of Search ................................... 375/232, 233, 375/231

[56] References Cited

U.S. PATENT DOCUMENTS

| | | | |
|---|---|---|---|
| 4,730,343 | 3/1988 | Kanemasa et al. ...................... | 375/233 |
| 5,031,193 | 7/1991 | Atkinsson et al. ...................... | 375/233 |
| 5,097,482 | 3/1992 | Serizawa et al. ......................... | 375/233 |
| 5,594,756 | 1/1997 | Sakurai et al. ........................... | 375/233 |
| 5,642,382 | 6/1997 | Juan ......................................... | 375/233 |
| 5,646,958 | 7/1997 | Tsujimoto ................................ | 375/233 |

OTHER PUBLICATIONS

IEEE Trans. Commun. Tech., vol. COM–19, No. 3, 1971, George D.A. Bowen, R.R. Storey J.R., "An Adaptive Feedback Equalizer", pp. 281–293.

Proakis, J.G. "Digital Communications" (1989) McGraw–Hill, New York. pp. 554–597.

*Primary Examiner*—Chi H. Pham
*Assistant Examiner*—Khai Tran
*Attorney, Agent, or Firm*—Ware, Fressola, Van Der Sluys & Adolphson LLP; Milton Oliver

[57] ABSTRACT

The invention is related to a method and circuit arrangement for compensating for delayed components of a received transmission signal especially in a digital transmission system based on physical lines. The method and arrangement utilize a decision feedback equalizer, wherein the weighted sum of decisions based on earlier samples is subtracted from a sample. According to the invention, delayed components in the signal are measured in a measuring unit (11). The earlier decisions to be subtracted from a signal sample are selected from a predetermined group of consecutive decisions, and the strength of the delay component in the delay between each decision and the signal sample is used as a selection criterion. Advantageously, the equalizer according to the invention includes a selector (8) which connects some of the taps of the delay line (7) to multiplier units (9). By means of this method and arrangement it is possible to implement with a small number of multiplier units an equalizer capable of compensating for delayed components with long delays.

21 Claims, 5 Drawing Sheets

METHOD AND CIRCUIT ARRANGEMENT FOR COMPENSATING FOR DELAYED COMPONENTS IN TRANSMISSION SIGNAL

TECHNICAL FIELD

The invention relates to a method and circuit arrangement for compensating for delayed components in a received signal in a digital transmission system such as a cable television system.

BACKGROUND OF THE INVENTION

In a normal transmission cable network there may occasionally occur echoes, i.e. delayed signal components, with up to a 2 to 3-μs delay. These echoes cause signal distortion, whereby errors appear in the received information.

Digital cable TV transmission systems require high symbol rates, such as 7 MBd, wherefore multi-state modulation is needed, e.g. 32QAM or 64QAM (quadrature amplitude modulation). However, when using such a modulation method, non ideal characteristics of the transmission path are especially prone to cause errors in the received information.

It is known to use a so-called decision feedback equalizer to equalize for a signal containing interference in a receiver. FIG. 1 shows the structure of a conventional decision feedback equalizer. The interaction of the preceding signal samples is removed from a complex signal sample arriving in the equalizer by subtracting from it the weighted sum of previous decisions $s_{k-1}, s_{k-2}$ ... etc. in an adder 1. The adder produces an equalized sample $y_k$. The current decision $s_k$ of the transmitted signal is made on the basis of the equalized sample e.g. by quantizing or by calculating minimum distances. The weighted sum of the previous decisions is produced by taking the decisions made to a delay line 4, the taps m=1 to M of which produce the values $s_{k-m}$ of the previous decisions. These are weighted with weighting coefficients $c_m$ in multiplier units, or multipliers 5, whereby the weighted result for decision $s_{k-m}$ is $c_m \cdot s_{k-m}$. The results are summed in an adder 6, the output of which is thus $$\sum_{m=1}^{M} c_m \cdot s_{k-m}.$$

It is typical of the conventional structure that there are a fixed number M of the multiplier units and taps of the delay line and that the M last decided values $s_{k-m}$ thus constitute the outputs of the delay line.

The operation of a conventional transversal equalizer is described in greater detail in the following documents:

[1] IEEE Trans. Commun. Tech., vol. COM-19, no. 3, 1971, George D. A., Bowen R. R., Storey J. R., "An Adaptive Feedback Equalizer", pp. 281 to 293 and

[2] Proakis, J. G.: Digital communications (1989) McGraw-Hill, Inc., New York, pages 554 to 597.

If one wishes to realize an equalizer capable of compensating for echo components with arbitrary delays using known methods, one needs an equalizer containing in its return branch taps and multiplier units at delay intervals of the length of symbol duration. The coupling formed by taps and multiplier units is called a tap coupling. The number of delay line taps and multiplier units needed is at least such that the longest delay of the equalizer delay line equals the maximum delay equalized.

A QAM signal represents a complex I/Q signal, whereby the equalizer needs delay lines separately in the I and Q branches and multiplier units in their taps which also perform cross-multiplying and summing between the branches. Therefore, using known solutions, the implementation of the equalizer would be very complicated.

To achieve in a cable television network sufficient equalization for the QAM-modulated signal mentioned above, a conventional equalizer might require up to 20 fixed-delay taps with multiplier units in both branches. Such an equalizer would constitute an unreasonable cost factor in the manufacturing of a receiver, especially in a consumer electronics device, where the manufacturing costs are of primary importance.

SUMMARY OF THE INVENTION

The object of the invention is to provide a method and circuit arrangement for compensating for errors caused by delayed signal components, without the aforementioned disadvantages.

The essential idea of the invention is that in a decision feedback equalizer the earlier decisions to be subtracted from the signal sample are selected from a predetermined set of successive decisions, and the selection criterion is the strength, in the received signal, of the delay component of the delay between each decision and the signal sample. This is advantageously realized by a decision feedback equalizer, in which the number of multiplier units is smaller than the number of delay line taps, and the selector unit connects only some of the delay line taps to the multiplier units.

BRIEF DESCRIPTION OF THE DRAWINGS

The invention is described by means of the attached drawing, where.

BEST MODE FOR CARRYING OUT THE INVENTION

In the description set forth below, the following block numbers are used in the figure:

| | | | |
|---|---|---|---|
| 1 | Adder | 8 | First selector |
| 2 | Decision circuit | 9 | Multiplier unit in variable part |
| 3 | Adder | 10 | Second selector |
| 4 | Delay line | 11 | Measurement unit |
| 5 | Multiplier unit | 12 | Register |
| 6 | Adder | 13 | Control unit |
| 7 | Delay line | | |

Figure 1:
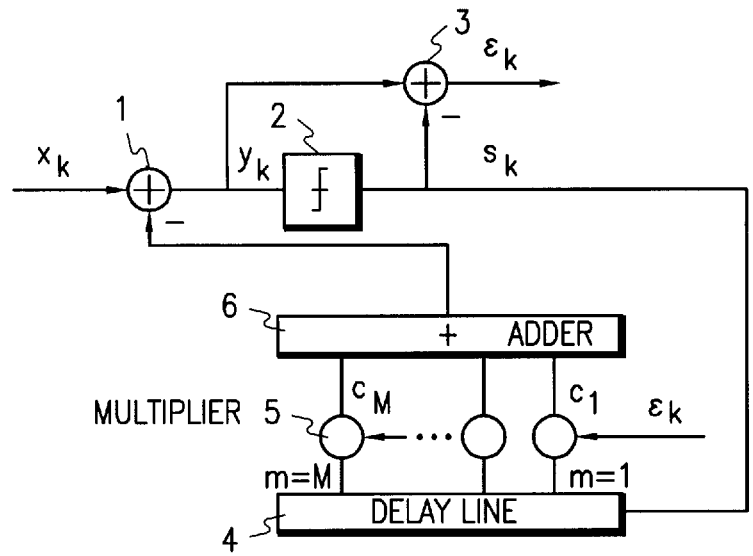
FIG. 1 shows a decision feedback equalizer according to the prior art.
Figure 2:
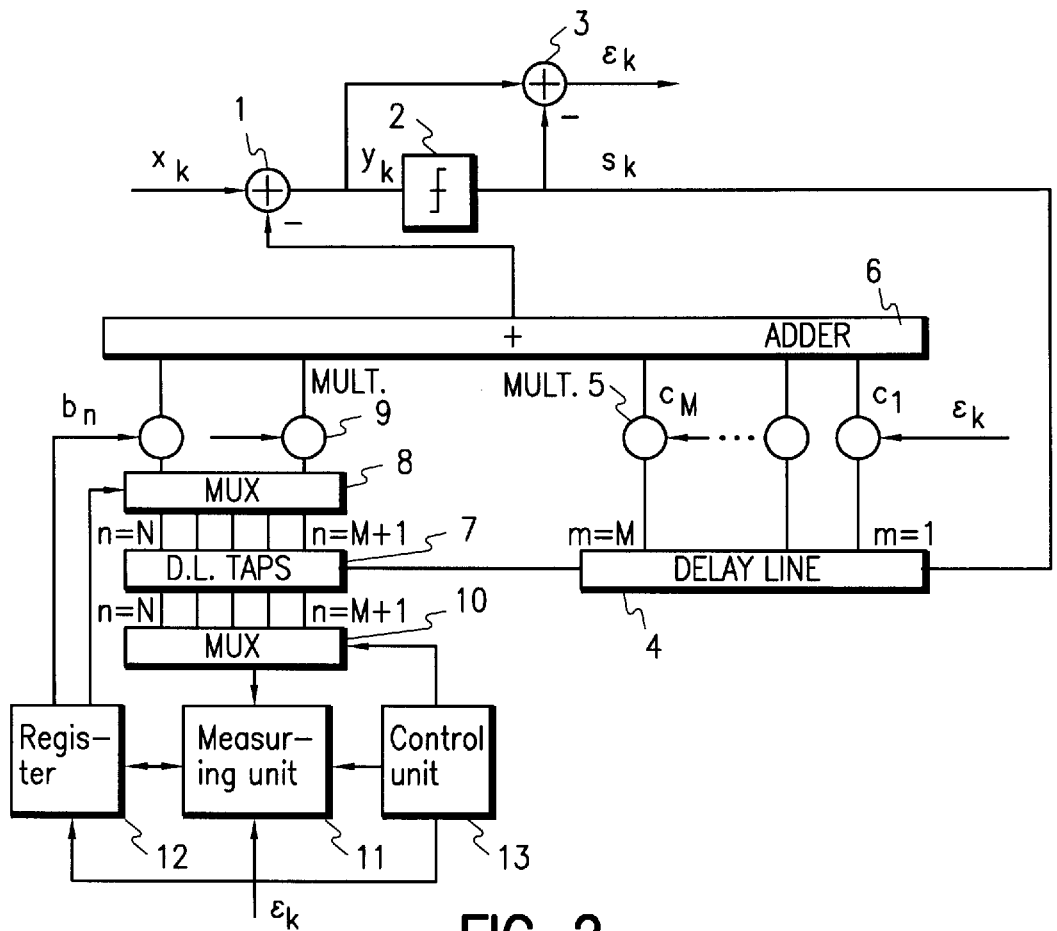
FIG. 2 shows a variable-length decision feedback equalizer according to the invention.

FIG. 2 illustrates an embodiment according to the invention. When using a quadrature modulation method such as quadrature amplitude modulation (QAM), the block diagram in FIG. 2 describes the implementation principle with complex signals. Implementation with real signals is presented later. When using a non-quadrature modulation method such as conventional pulse amplitude modulation (PAM), the block diagram in FIG. 2 can be applied as such.

The solution according to the invention possibly contains a conventional part in which the taps of the delay line 4 have fixed multiplier units 5 with delay intervals of symbol duration $T_s$. The ordinal number of these taps and multipliers is below marked by index m, whereby the number of taps and multipliers in this fixed part is M. The weighting coefficients $c_m$ of these multipliers can be controlled in the multiplier unit e.g. with a known gradient method, thereby providing an equalizer fixed part that minimizes the square error. Then the new coefficients $c_{m,k+1}$ at the moment k+1 can be calculated as follows:

$$C_{m,k+1} = C_{m,k} + \Delta \cdot \epsilon_k \cdot s^*_{k-m}, \qquad (1)$$

where s* means the complex conjugate of the decision value and where $\Delta$ is a proportional coefficient the value of which is advantageously $0 < \Delta < 1$. Decision error $\epsilon_k$ is the difference of equalized sample $y_k$ and decision $s_k$. In formula (1) the latter term thus represents the momentary decision error gradient relative to the weighting coefficient $c_m$. The purpose of the proportional coefficient is to decrease coefficient variance.

The solution according to the invention contains a variable part, in which multipliers 9 are connected to those delay line 7 taps in which the highest gradient values are detected. The number of multipliers 9 is smaller than the number of delay line 7 taps in the variable part. Thus, the delay line taps represent a predetermined set of previous successive decisions $s_{k-n}$, from which are selected those previous decisions, the weighted sum of which is subtracted from signal sample $x_k$. Below, the delay line taps in the variable part are marked by index n so that the index of the first tap is n=M+1 and the index of the last output is n=N, whereby N is the total number of outputs in the fixed and variable part. Variable Z represents the total number of multipliers in the fixed and variable part.

To determine the gradient values, each tap is measured for a time in the measurement unit 11 and a cumulative sum is gathered. For tap n we get the measurement result $$p_n = \frac{1}{P_s(L+1)} \sum_{l=k-L}^{k} \epsilon_l \cdot s^*_{l-n}, \qquad (2)$$

whereby averaging is performed for (L+1) samples. $P_s$ is the average power of the signal which can be pre-calculated on the basis of the signal state diagram. At the initial stage, when the multipliers 9 are unconnected, values $p_n$ represent equalization need and it is advantageous to place the multipliers in taps n in which the measurement results $|p_n|^2$ are the greatest. Figures proportional to the results $p_n$ are set as initial values of coefficients. When L increases limitlessly, formula (2) yields the required weighting coefficient value. With finite L values, a good estimate is obtained for these. The estimate is better the longer the measurement the performed, i.e. the greater L is. So the measurement result $|p_n|^2$ represents the strength of a delay component in a signal, wherein the delay of the delay component is the delay between the signal sample $x_k$ and the signal sample $x_{k-n}$ corresponding to tap n.

When the multiplier units 9 have been connected to taps n, the multipliers decrease the error, whereby measurement results from taps with multipliers are small. Then it is no longer possible to directly deduce from the size of the gradients how to place the multipliers. In taps that have multipliers, we can take the value of the weighting coefficient as the reference value. If a measurement result is detected the absolute value of which is greater than the smallest weighting coefficient used, the coefficient in question is replaced so that its location and value correspond to the measurement result. In the comparison, it is advantageous to require a little difference, or hysteresis, of the new value with respect to the old one when changing the location of the multiplier unit in order to avoid connecting the multiplier units 9 back and forth between nearly equal locations. Comparison of measurement results can be advantageously performed in a control unit 13.

When measuring a tap that already has a weighting coefficient, the result is a small value. That value can be used to equalize the value of the weighting coefficient stored in memory according to the normal gradient algorithm. It is then advantageous to multiply the measurement result by the proportional coefficient $\delta$ ($0 < \delta \leq 1$) before adding it to the old value to control coefficient value variance. All taps are thus measured in a continuous cycle. If a result is detected which is greater than the smallest characteristic $|b_n|^2$ of a tap that has a multiplier connected to it, the multiplier in question is changed to this new tap. Then the weighting coefficient corresponding to this new tap is updated according to the algorithm described above.

In the circuit arrangement illustrated by FIG. 2, the functions described above are implemented as follows. The circuit contains M multipliers 5 connected permanently to a delay line 4, which constitute the fixed part, and a delay line 7. The delay lines 4 and 7 have taps at intervals of symbol duration $T_s$. A first selector 8 is connected to the delay line 7, and it selects one or more of the taps. The selector 8 connects controllable multipliers 9 to the selected outputs; in the multipliers, the signal values of the outputs are multiplied by weighting coefficients $b_n$. The results of both the fixed and the variable part are taken to an adder 6. To determine the values and locations of coefficients $b_n$ all taps n=M+1 ... N are measured in turns according to formula (2) through a second selector 10 using measuring means 11. First, Y values $p_n$ corresponding to the greatest result $|p_n|^2$ and the tap addresses $A_n$ are stored in a register 12. The first selector 8 is used to connect multipliers 9 to the taps corresponding to the addresses $A_n$ of the delay line 7, and, initially, values $p_n$ are set as the weighting coefficients $b_n$ of the multipliers. Also the values $|b_n|^2$ are stored in the register 12.

In the next rounds, new measurements are performed. The measurement results are compared with the smallest value $|b_n|^2$ in the memory. If the result is greater than the value in the memory, which includes the possible hysteresis margin, the tap connection is changed. A new detected value, the corresponding tap address and value $p_n$ are now stored in the memory. When measuring the value $p_n$ corresponding to the multiplier connected to the tap, the $b_n$ value in the memory is corrected according to the gradient formula, i.e.

$$b_{n,new} = b_{n,old} + \delta \cdot p_n \qquad (3)$$

Thus, the weighting coefficients are updated more and more accurately toward the correct values as the measurements go on.

A control unit 13 controls the measurements and the storing of measurement results in the register 12 and also the connection of multipliers 9 and setting of weighting coefficients $b_n$. These control functions can be realized by one control unit or two separate control units, one of which controls the measurements and the other the multipliers.

Figure 3:
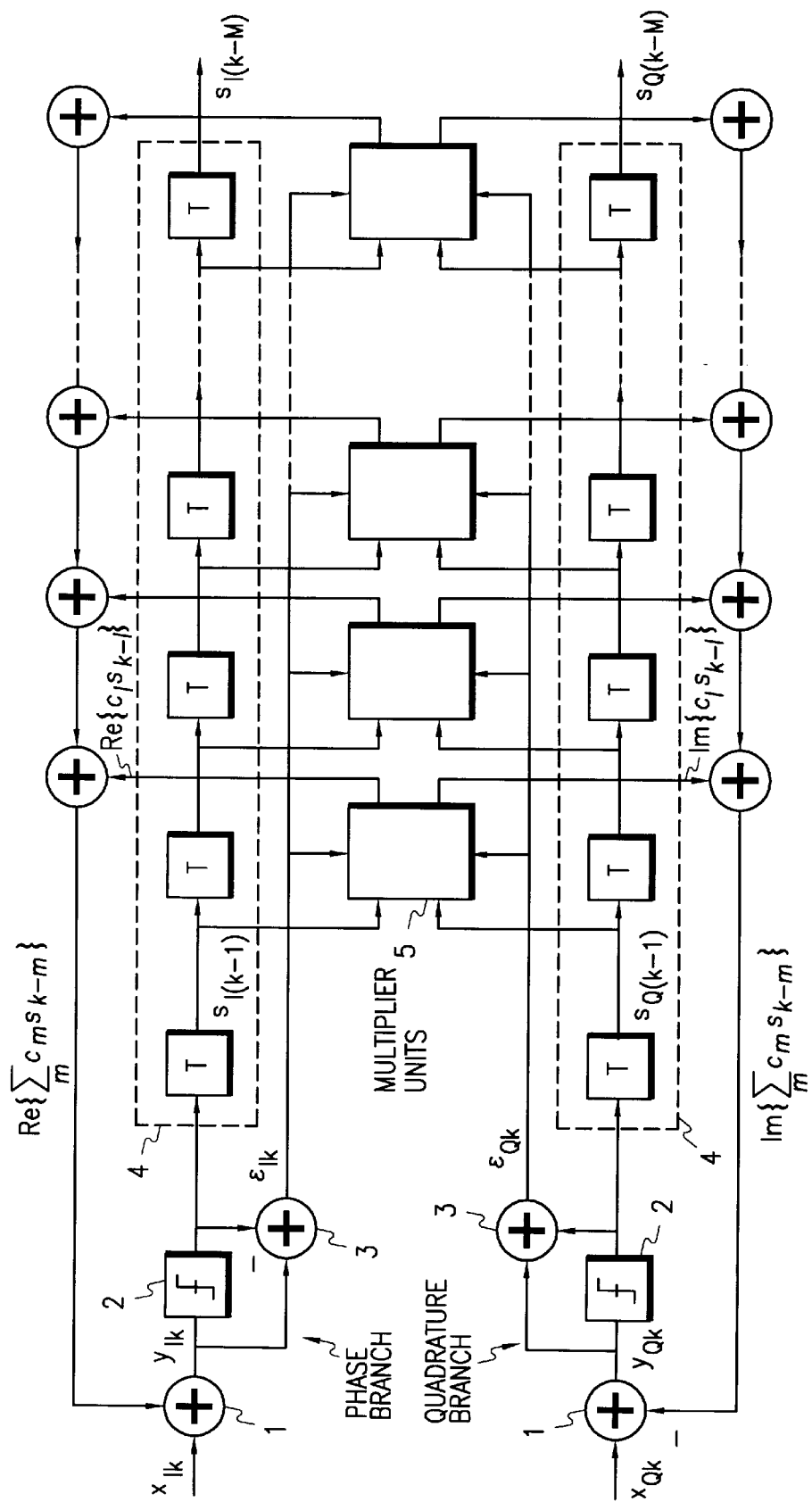
FIG. 3 shows the structure of the fixed part of the equalizer according to the invention.

Next we will discuss the implementation of the I and Q branches of an equalizer according to the principle described above when using quadrature modulation. FIG. 3 shows the implementation of the fixed part of the equalizer. Signals $x_{Ik}$ and $X_{Qk}$ are samples of the phase (I) and quadrature (Q) branches of a demodulated signal. From these it is subtracted equalization signals $$Re\left\{\sum_m c_m s_{k-m}\right\} \text{ and } Im\left\{\sum_m c_m s_{k-m}\right\},$$

yielding as a result samples $y_{Ik}$ and $y_{Qk}$. A decision is made on the basis of these in a decision unit 2 using e.g. a quantization method. The difference $\epsilon_k$ of the signal value $y_k$ before the decision and the decided value $s_k$ is calculated by adders 3 in both branches (I and Q). This can be realized either with discrete operational amplifiers or by combining the decision-making and difference calculation in a signal processor. Decisions of both branches are taken to delay lines 4, which have taps at intervals of symbol duration. The delay lines can be implemented e.g. using shift registers.

Figure 4:
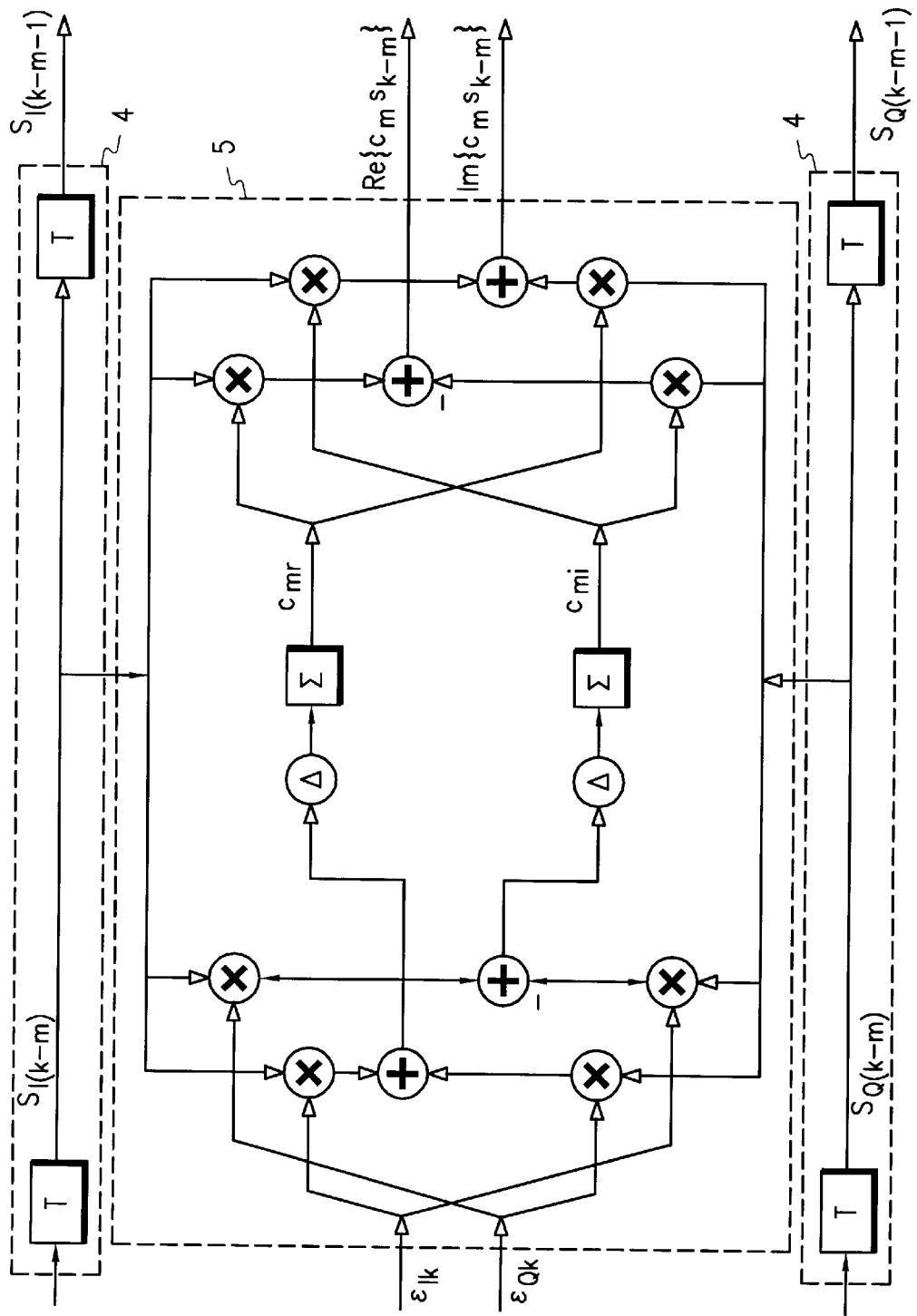
FIG. 4 shows the structure of the correlator multiplier in the fixed part of the equalizer according to the invention.

The taps are taken to multiplier units 5. FIG. 4 shows a known correlator coefficient unit 5, in which the weighting coefficients are developed using a gradient method, wherein the least square sum is minimized. In this part it is possible to use other methods as well, such as the zero forcing method, for example. The correlator coefficient and development methods for weighting coefficients are described in greater detail e.g. in reference [2]. The functions of the multiplier unit can be realized as an integrated circuit (ASIC) or in a signal processor circuit.

Figure 5:
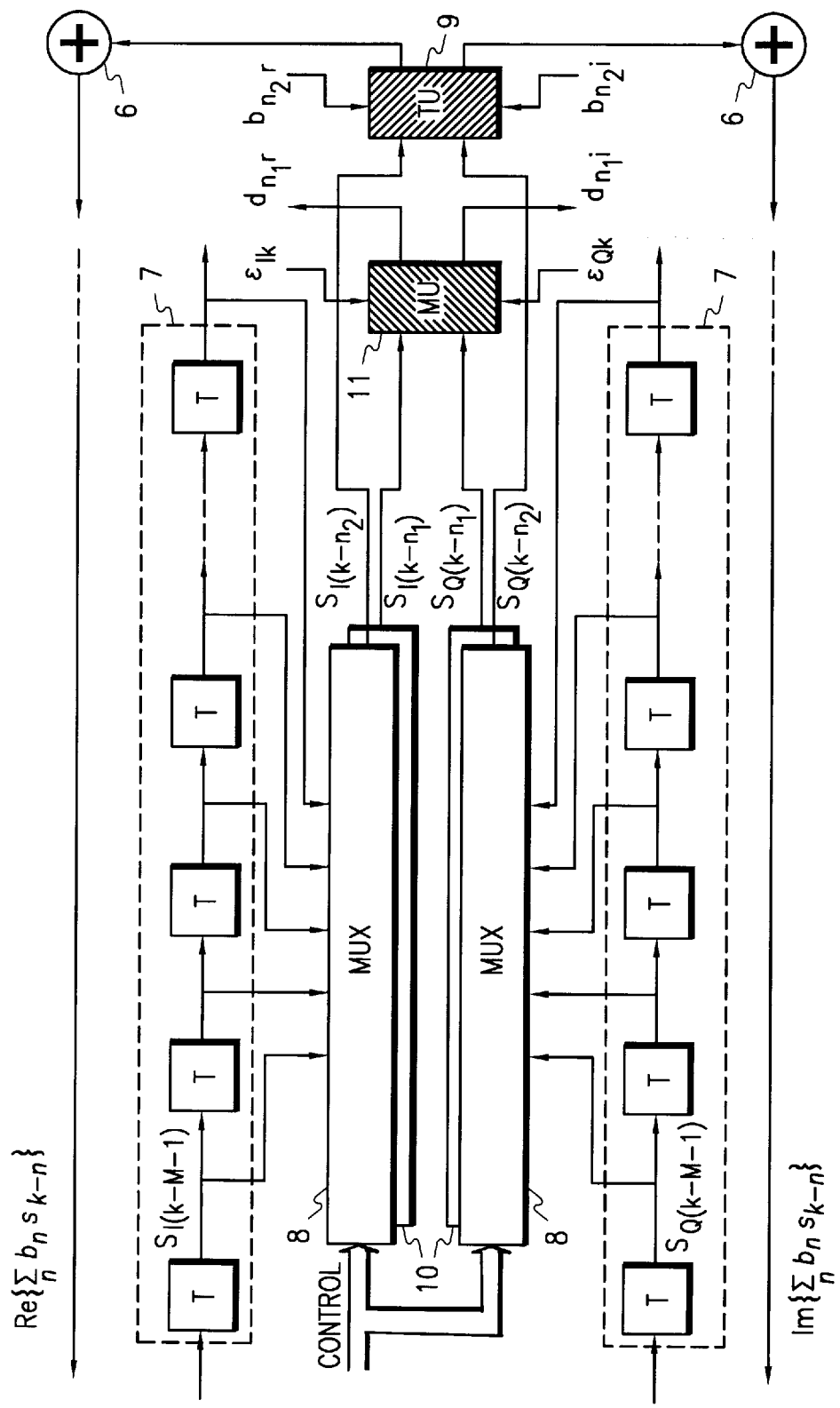
FIG. 5 shows the structure of the variable part of the equalizer according to the invention.
Figure 7:
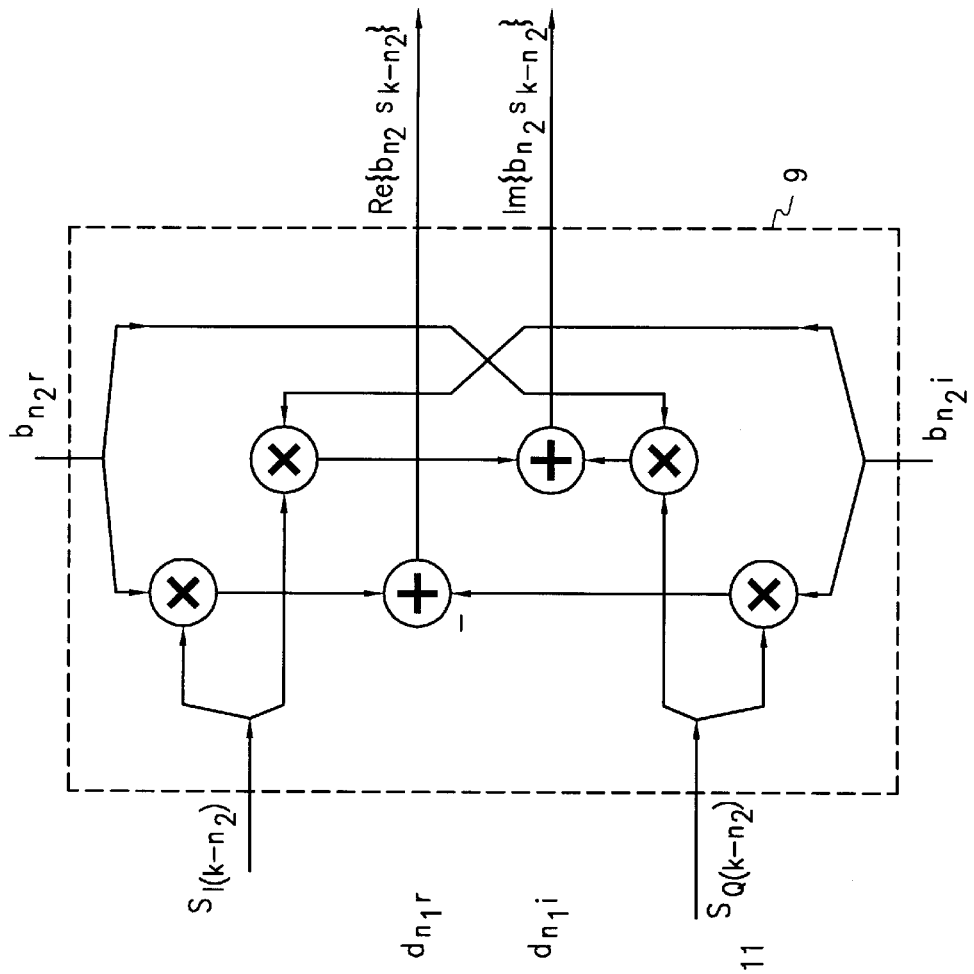
FIG. 7 shows the structure of the multiplier unit in the variable part of the equalizer according to the invention.
Figure 6:
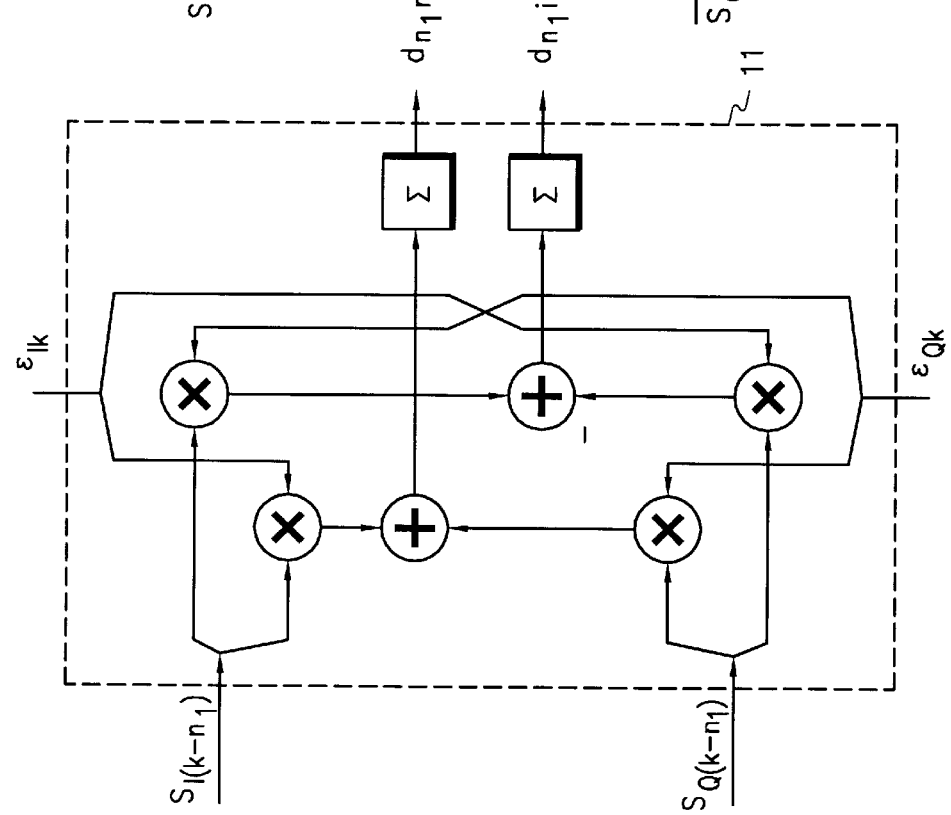
FIG. 6 shows the structure of the measurement unit in the equalizer according to the invention.

FIG. 5 illustrates the implementation of the variable part of the equalizer. The shift register 7 can be similar to the shift register 4 in the fixed part and can be its direct continuation. The taps are now taken to two selector pairs 8 and 10. The selector pair 10 is used to select the tap having index n the value of which is measured by the measurement unit 11 (MU). The internal structure and principle of the measurement unit is illustrated by FIG. 6. The outputs $d_{nr}$ and $d_{ni}$ of the measurement unit conform to the following formulas:

$$d_{nr} = Re\left\{\sum_{l=k-L}^{k} \epsilon_i \cdot s_{l-n}^*\right\} = \sum_{l=k-L}^{k} \epsilon_{Il} \cdot s_{I(l-n)} + \epsilon_{Ql} \cdot s_{Q(l-n)} \quad (4)$$

$$d_{ni} = Im\left\{\sum_{l=k-L}^{k} \epsilon_i \cdot s_{l-n}^*\right\} = \sum_{l=k-L}^{k} \epsilon_{Ql} \cdot s_{I(l-n)} - \epsilon_{Il} \cdot s_{Q(l-n)}$$

These give the real and imaginary parts of the measurement result $p_n$ according to formula (2) by scaling with coefficient $$\frac{1}{P_s(L+1)}.$$

If no multiplier is connected to the tap in question, this value is used in the comparisons.

If a weighting coefficient is already connected to the tap through selector pair 8 by means of multiplier unit 9 (TU), the weighting coefficient is updated in register 12 (see FIG. 2) according to formula (3), controlled by control unit 13. The real pails $b_{nr}$ and imaginary parts $b_{ni}$ of the weighting coefficient in register 12 are brought to the multiplier unit 9 in which they and samples $s_{I(k-n)}$ and $s_{Q(k-n)}$ are used to form the real and imaginary parts of product $b_n s_{(k-n)}$. The multiplier unit output signals are taken to their respective adder lines 6 in the same way as in the fixed part according to FIG. 5.

Since the measurement unit 11 and multiplier unit 9 can at a given moment be connected through selectors to different taps, the tap index shown in the figures is $n_1$ in connection with the measurement event and $n_2$ in connection with the weighting coefficient generation.

The measurement unit 11 and tap unit 9 shown here can be advantageously implemented as application specific integrated circuits (ASIC). It is also possible to realize all functions described here with a signal processor. The most advantageous arrangement depends on the application. The selector can be implemented using multiplexer circuits, for example.

In the above a structure was disclosed which includes only one measurement unit and one multiplier unit 9. We can add multiplier units and measurement units by arranging a special selector unit 8, 10 for each of them and by arranging the operation of the control unit 13 and the size of the register 12 to correspond to the number of multiplier units and measurement units. The taps of the delay line 7 can be measured in turns, thereby needing only one measurement unit. Correspondingly, the storing of measurement results and weighting coefficients can be implemented using only one register 12. If the number of taps is great, several measurement units can be used in order to achieve sufficient speed.

The solution according to the invention provides a remarkable cost advantage in manufacturing in comparison with the prior art solutions. Fewer multiplier units are needed in an equalizer of a receiver because they can be used in delay locations in which the delayed signal components are the strongest. The arrangement is especially advantageous in cases where the delay range to be equalized is over ten times the symbol duration. Then it is possible to achieve an equalizer capable of compensating for long delays with a small number of logic circuits and a few, e.g. two to three, variable weighting coefficients.

The above described applications for the method according to the invention. Naturally, the principle according to the invention can be varied within the scope of the invention, e.g. with respect to the implementation details and the field of use. The invention is thus not limited to a digital cable television system but it can be applied to other transmission systems as well, especially to digital data transmission networks based on physical lines.

I claim:

1. A method of compensating for one or more delayed components included in a received signal, representing a sequence of symbols, using decision feedback equalizing, comprising the steps of:

determining values of a plurality of prior consecutive decisions derived from said received signal, selecting a subset of said prior consecutive decision values, as a function of strength of a measured delay component, for weighting and subtraction from a current signal sample ($x_k$), and weighting said selected subset of decision values and subtracting a sum of said weighted decision values from said current signal sample, thereby producing a decision ($s_k$) for said current signal sample ($x_k$).

2. The method of claim 1, wherein said plurality of consecutive decision values is greater than the number of decision values selected, a number Z, representing a number of multipliers used in carrying out said weighting step, and a maximum delay $T_m$ of the prior decisions, said sum of which weighted decision values is subtracted from the current signal sample ($x_k$), are predetermined, so that $$Z < \frac{T_m}{T_s}$$

where $T_s$ is the symbol duration of each symbol in said received signal.

3. The method of claim 2, further comprising the step of selecting, from the decisions belonging to said set of prior consecutive decisions, to be subtracted from the current signal sample, those decisions that have delays relative to said signal sample such that the delay components associated with the delays of the decisions being selected are the strongest in said received signal, and the delays of the decisions being selected are at the most equal to a maximum delay $T_m$ of the system.

4. The method of claim 1, characterized in that in order to determine strength of a delay component associated with a delay $T_n$ of each tap n in a sequence of taps, and to thereby determine equalization need, a cumulative sum $$p_n = \frac{1}{P_s(L+1)} \sum_{l=k-L}^{k} \epsilon_l \cdot S^*_{l-n}$$

is measured, where averaging is performed for (L+1) samples, $P_s$ is the average power of said received signal, k is the ordinal number of the sample, $\epsilon$ is the decision error and s* is the complex conjugate value of the decision.

5. The method of claim 4, characterized in that a first selection, of said prior decisions to be subtracted from the current signal sample ($x_k$), is performed by measuring cumulative sum values $p_n$ without subtracting, from the current signal sample, the prior decisions, the measured cumulative sum values $p_n$ are compared to each other and those prior decisions $s_{k-n}$, whose corresponding cumulative sum values $p_n$ are the greatest, are selected to be subtracted, weighted, from the current signal sample.

6. The method of claim 5, wherein, for each tap n, a value proportional to said cumulative sum value $p_n$ is used as a respective weighting coefficient ($b_n$) applied in said weighting step.

7. The method of claim 4, wherein the respective weighting coefficients are equalized according to a formula $b_{n,new} = b_{n,old} + \delta \cdot p_n$, where $\delta$ has a value within the range $0 < \delta < 1$.

8. The method of claim 4, characterized in that when said cumulative sum is a value $p_n$, which is greater than a smallest weighting coefficient used, with a predetermined hysteresis margin added to it, the decision corresponding to said cumulative sum is selected to be subtracted from the signal sample instead of the decision corresponding to the smallest weighting coefficient in use, and a value corresponding to said cumulative sum $p_n$ is set as the weighting coefficient.

9. The method of claim 1, characterized in that at least one of the previous decisions to be subtracted, weighted, from the signal sample, is subtracted permanently without selection.

10. The method of claim 9, characterized in that a set of decisions is subtracted without selection and comprises consecutive preceding decisions.

11. The method of claim 9, characterized in that a weighting coefficient for the decisions subtracted without selection is generated using the least squares method.

12. A circuit arrangement for compensating for delayed components in a received signal, including
- a decision feedback equalizer which has, in a closed signal loop, connected in succession,
- a decision circuit (2) for making a decision for an equalized signal sample ($y_k$),
- a delay line (4,7) with taps (1-n),
- at least one multiplier unit (5,9) for multiplying a respective signal from each tap by a respective weighting coefficient ($b_n$, $c_m$), and
- at least one adder (1,6) to subtract equalization signals, obtained from the multiplier units, from the current signal sample before input to the decision circuit (2),
- further comprising
- a first selector (8) coupled to said delay line (7) for selecting at least one tap (n) of the delay line (7) to be connected to said at least one multiplier unit (9).

13. The circuit arrangement of claim 12, wherein each weighting coefficient ($b_n$) of said at least one multiplier unit (9) connected to the first selector is controllable.

14. The circuit arrangement of claim 12, further comprising
- measuring means (11) for measuring the signal level of a delay line tap and the decision error, and for performing calculations for the measurement values, and
- a second selector (10) which connects to said measuring means (11) one of said taps from said delay line.

15. The circuit arrangement of claim 14, further comprising
- a register (12) for storing results of said measuring.

16. The circuit arrangement of claim 15,
further comprising a first control unit (13) which controls the second selector (10), measuring means (11), and the register (12) so that measurement results, obtained from those delay line (7) taps to which a multiplier is connected, are stored in the register (12).

17. The circuit arrangement of claim 16, further comprising
- a second control unit (13), which controls the first selector (8) and multipliers (9) on the basis of said measurement results stored in the register (12).

18. The circuit arrangement of claim 12,
further comprising an I branch and a Q branch, both of which contain delay lines (4, 7), first selectors (8) and second selectors (10) for in-phase and quadrature components in the received signal.

19. The circuit arrangement of claim 12, wherein at least one of the first taps of the delay line (4) is connected to a multiplier in a fixed manner.

20. The circuit arrangement of claim 19, wherein the multiplier connected in a fixed manner is a correlator multiplier minimizing the sum of the squares.

21. A method of compensating for delayed components in a signal received via a cable television system by using decision feedback equalizing,
comprising the steps of:
- determining values of a plurality of prior consecutive decisions derived from said received signal,
- selecting a subset of said prior consecutive decision values, as a function of strength of a measured delay component, for weighting and subtraction from a current signal sample ($x_k$), and
- weighting said selected subset of decision values and subtracting a sum of said weighted decision values from said current signal sample, thereby producing a decision ($s_k$) for said current signal sample ($x_k$).

* * * * *